(No Model.)
T. J. KIRKPATRICK.
CYCLE SADDLE.
No. 603,789.  Patented May 10, 1898.
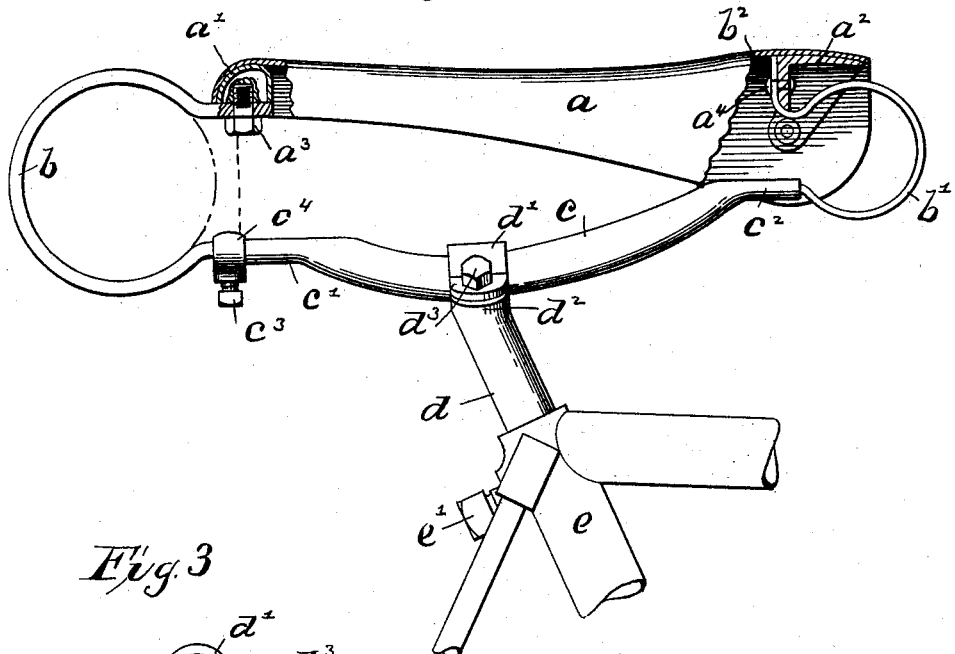
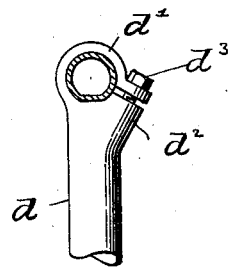
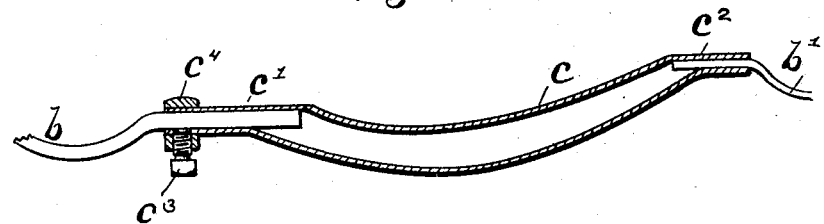
Witnesses
G. M. Gridley
Chas. J. Welch
Inventor
Thomas J. Kirkpatrick
By his Attorney

UNITED STATES PATENT OFFICE.

THOMAS J. KIRKPATRICK, OF SPRINGFIELD, OHIO.

CYCLE-SADDLE.

SPECIFICATION forming part of Letters Patent No. 603,789, dated May 10, 1898.

Application filed November 23, 1895. Serial No. 570,446. (No model.)

*To all whom it may concern:*

Be it known that I, THOMAS J. KIRKPATRICK, a citizen of the United States, residing at Springfield, in the county of Clark and State of Ohio, have invented certain new and useful Improvements in Cycle-Saddles, of which the following is a specification.

My invention relates to that class of saddles which employ independent front and rear springs in connection with a flexile hammock-seat, and it particularly relates to improvements in the saddle which has become generally known in the trade as the "Kirkpatrick" saddle, as set forth in my former patent, No. 314,142.

The object of my invention is to simplify the constructions of saddles of this class heretofore employed and also to improve the form of the springs and their connections, so as to secure the proper elasticity and give to the seat the proper movement and adaptability to the rider under the ordinary conditions of riding.

A further object of my invention is to lighten and cheapen the construction of saddles of this character.

I attain these objects by the constructions shown in the accompanying drawings, in which—

Figure 1 is a side elevation, partly in section, of a saddle embodying my invention. Fig. 2 is a longitudinal sectional view of a portion of the saddle-support. Fig. 3 is a transverse sectional view of the same.

Like parts are represented by similar letters of reference in the several views.

In the said drawings, $a$ represents a flexile hammock-seat, which is preferably made of leather or other flexile material without any frame or tree, the flexile material of the seat being secured at the rear in the usual way to a cantle $a'$ and at the front to a suitable clip $a^2$ to give the parts the proper shape or distention at these points. The cantle $a'$ is connected by a screw $a^3$ or other suitable connecting device to a rear spring $b$. The clip $a^2$ is connected by means of a suitable connection, preferably a rivet $a^4$, to a front spring $b'$. Each of the springs $b$ and $b'$ is made of a peculiar shape—that is to say, of a substantially circular form—with the ends bent outwardly to form points of connection which stand when in use vertically one over the other, these ends respectively being within horizontal lines extended through the inner circle of said spring and with the points of connection tangent to the outside of the same circle continued, as indicated by dotted lines to the left in Fig. 1.

For supporting the springs I employ a hollow supporting-piece $c$, which is preferably formed from a tube, with the ends swaged down, as shown at $c'$ and $c^2$, to receive the extended ends of each of the springs $b$ and $b'$, the main body of said support being curved to support the respective ends of the saddle at the proper elevation and furnish means for adjusting the same in the manner hereinafter more fully set forth.

The support $c$ is adapted to be connected to the frame of the machine through the medium of an adjustable supporting-post $d$, which is also preferably formed of a tube, one end of which is swaged out to form a clamp $d'$, a boss $d^2$ being brazed or otherwise secured to said tube to receive a clamping-screw $d^3$, which extends through the end of the clamp $d'$ and engages in said boss. By loosening or tightening the clamp $d'$ the support $c$ may be moved back and forth through the supporting-post, and thus, by reason of the curvature of said support, adjust the saddle in a well-known manner.

To provide for adjusting the tension of the flexile seat $a$, one or both of the springs may be adjusted in the hollow support $c$. In the drawings I have shown the rear spring only adjustable, the front spring being extended into the socket formed in the front end of the support and held therein by the tension of the respective springs acting through the medium of the flexile seat. The rear spring, however, is provided with means for adjustment, which consists, preferably, of a set-screw $c^3$, which extends through a collar $c^4$, slipped onto the end of the hollow support $c$. This collar $c^4$ may be separate and apart from the support, the set-screw $c^3$, which is adapted to extend through the collar and through the end of the hollow support, being sufficient to hold all the parts firmly together and materially cheapen the construction, as by the construction thus described the parts may be assembled with little or no machine-work other than what is necessary to shape the respective parts to their proper form.

The supporting-post $d$ is adapted to slide into the usual tubular portion $e$ of the frame and be held therein by a set-screw $e'$ in the usual manner.

The upper end of the front spring $b'$ is preferably turned upwardly, so as to stand in a vertical position, as shown at $b^2$, the rivet or other connection $a^4$ being adapted to stand at right angles thereto or in a horizontal plane, so that, if desired, the connection may be a loose or pivoted one to permit a certain amount of lateral motion of the saddle, if desired, at this point.

From the above description it will be seen that I provide a saddle which may be formed extremely light, and thus meet the requirements of the market in this direction. At the same time it retains all the characteristics of the independent front and rear springs which have proved in practice to be so desirable. In addition to this by reason of the special construction and shape of the springs, as described, the respective ends of the saddle are adapted by the vibrations thereof, caused by the yielding of the springs to compensate for jolts or jars, to move in a substantially vertical line, and as the tendency of the springs as the weight is applied thereto is to close at the respective ends in the direction of the circle as continued the inward movement of the respective ends of the saddle, which would result in causing the saddle to bag in the center, is to a large measure overcome. Also a substantially vertical vibration of the seat is secured.

Having thus described my invention, I claim—

1. In a velocipede-saddle, a hollow tubular support curved at the center and formed at the ends with flattened sockets as described, independent front and rear springs each of a substantially circular form with projecting ends, the projecting ends of each spring being extended laterally and parallel to each other on a line which forms a secant to the inner circle of said spring, each of said springs being fitted at one end to the sockets in said base, and a seat connected to the remaining ends of said springs with the points of attachment in line with or on the outside of the inner circles of said springs extended, substantially as and for the purpose specified.

2. The combination with a seat, of independent front and rear springs for said seat, a hollow tubular support flattened at the ends and formed with sockets to receive the ends of said springs which are also formed flattened to correspond with said sockets, each of said springs being formed on the arc of a circle with the ends of the spring extending laterally and parallel to each other from the circular body on lines forming secants to said circle with the points of attachment of each of said springs to the base and seat respectively substantially over each other and on the outside or tangent to said circle, substantially as specified.

3. The combination with a hollow tubular base circular in cross-section and curved in the center as described, said base being swaged and flattened at the ends to form rectangular sockets, independent supporting-springs having circular bodies and laterally-projecting ends, one end of each of which is fitted to said sockets, a seat connected at each end to the ends of said supporting-springs with both of the supporting connections of each of said springs on lines forming secants to the circular bodies of said springs and substantially vertical over each other at the point on the outside of said circle, and a clamp fitted to the circular portion of said base, substantially as specified.

In testimony whereof I have hereunto set my hand this 18th day of November, A. D. 1895.

THOMAS J. KIRKPATRICK.

Witnesses:
CHAS. I. WELCH,
GEO. A. BEARD.